(12) United States Patent
Miller et al.

(10) Patent No.: US 12,478,366 B2
(45) Date of Patent: Nov. 25, 2025

(54) DISPOSABLE ARTHROSCOPIC SUTURE CUTTING DEVICE

(71) Applicant: Conmed Corporation, Largo, FL (US)

(72) Inventors: Peter Miller, Largo, FL (US); Andrew Muser, St. Pete Beach, FL (US)

(73) Assignee: Conmed Corporation, Largo, FL (US)

( * ) Notice: Subject to any disclaimer, the term of this patent is extended or adjusted under 35 U.S.C. 154(b) by 439 days.

(21) Appl. No.: 18/009,008

(22) PCT Filed: Jun. 9, 2021

(86) PCT No.: PCT/US2021/036582
§ 371 (c)(1),
(2) Date: Dec. 8, 2022

(87) PCT Pub. No.: WO2021/252608
PCT Pub. Date: Dec. 16, 2021

(65) Prior Publication Data
US 2023/0210518 A1    Jul. 6, 2023

Related U.S. Application Data

(60) Provisional application No. 63/036,673, filed on Jun. 9, 2020.

(51) Int. Cl.
*A61B 17/04* (2006.01)
*A61B 17/00* (2006.01)

(52) U.S. Cl.
CPC .. *A61B 17/0467* (2013.01); *A61B 2017/0023* (2013.01)

(58) Field of Classification Search
CPC ............ A61B 17/0467; A61B 2017/0023
(Continued)

(56) References Cited

U.S. PATENT DOCUMENTS 5,439,470 A    8/1995    Li
8,109,945 B2    2/2012    Boehlke
(Continued)

FOREIGN PATENT DOCUMENTS

CN    105377151 A    3/2016
JP    S6338441 A    2/1988
(Continued)

OTHER PUBLICATIONS

International Search Report Form PCT/ISA/220, International Application No. PCT/US2021/036582, pp. 1-10, Dated Sep. 24, 2021.
(Continued)

*Primary Examiner* — Andrew Restaino
(74) *Attorney, Agent, or Firm* — Bond, Schoeneck & King, PLLC; David L. Nocilly (57) ABSTRACT

A suture cutter that can easily load and retain a tensioned or un-tensioned in place for cutting. The cutter has a handle with a an integral lever and a shaft is coupled to and extending from the handle. A tip has a cutting channel with a cradle for entrapping a suture prior to cutting. A piston in the handle drives a blade pusher to cut the suture in response to movement of the lever. A guide assembly in the body is formed from a pair of members folded together via a living hinge to provide a slot for the head of the piston. The pusher is planar and oriented horizontally within the shaft, while the blade is planar and is oriented vertically at right angles to the pusher. The blade has a tab that is captured by a notch in the pusher to interlock the blade and the pusher.

9 Claims, 10 Drawing Sheets

(58) Field of Classification Search
USPC .................................................. 606/139, 138
See application file for complete search history.

(56) References Cited

U.S. PATENT DOCUMENTS

| | | | |
|---|---|---|---|
| 8,282,659 | B2 | 10/2012 | Oren et al. |
| 9,101,356 | B1 | 8/2015 | Jordan |
| 10,463,362 | B2 | 11/2019 | Kurd et al. |
| 10,595,854 | B2 | 3/2020 | Nachmias et al. |
| 11,284,878 | B2 * | 3/2022 | Harrison ............ A61B 17/0467 |
| 2004/0254598 | A1 | 12/2004 | Schumacher et al. |
| 2006/0212045 | A1 * | 9/2006 | Schilling ............ A61B 17/0467 606/138 |
| 2010/0324597 | A1 * | 12/2010 | Shikhman .......... A61B 17/0467 606/232 |
| 2011/0100173 | A1 * | 5/2011 | Stone ................. A61B 17/0482 83/13 |
| 2011/0313430 | A1 | 12/2011 | Miller |
| 2014/0005689 | A1 * | 1/2014 | Griffiths ............. A61B 17/0467 606/138 |
| 2018/0235600 | A1 * | 8/2018 | Nachmias .......... A61B 17/0467 |

FOREIGN PATENT DOCUMENTS

| | | |
|---|---|---|
| JP | 2019526396 A | 9/2019 |
| KR | 20140103435 A | 8/2014 |
| WO | 2015178928 A1 | 11/2015 |
| WO | 2016168422 A1 | 10/2016 |
| WO | 2021252608 A1 | 12/2021 |

OTHER PUBLICATIONS

EP Office Action, Application No. 21 736 872.9-1122, Dated Mar. 3, 2025, Entire document, 5 pages.
Translated Japanese Office Action, Application No. 2022-575844, dated Aug. 22, 2023, pp. 1-7.
Translated Japanese Office Action, Application No. 2022-575844, dated Feb. 13, 2024, pp. 1-4.
Translated CN Office Action; Application No. 202180041756.9; Dated Jun. 18, 2025.

* cited by examiner

DISPOSABLE ARTHROSCOPIC SUTURE CUTTING DEVICE

CROSS-REFERENCES TO RELATED APPLICATIONS

This application is a national stage application under 35 U.S.C. 371 based on international patent application PCT/US21/36582 filed on Jun. 9, 2021, which claims priority to U.S. Provisional Patent Application Ser. No. 63/036,673, filed on Jun. 9, 2020, the entireties of which are incorporated herein by reference.

BACKGROUND OF THE INVENTION

1. Field of the Invention

The present invention relates to a disposable surgical suture cutting device and, more particularly, to a cutting device having improved suture containment.

2. Description of the Related Art

Surgical sutures are used as part of nearly every surgical procedure. Even though the medical industry typically uses the generic term "suture" to describe a filament used in these surgical procedures, suture material can vary depending on the task to be accomplished. Suture material may be used that rivals stainless steel wire in terms of strength while retaining the flexibility of lower strength materials. For example, ultra high molecular weight polyethylene is now being used as a non-absorbable suture in locations, such as knee, shoulder, and other connective tissue repairs, where the surrounding tissue and/or suture anchors can support the additional loads made possible by such a high strength suture material. As a result, suture materials can be very hard to cut as their strength increases. A conventional approach to addressing high strength suture material involves the use of a suture cutter that is designed to cut the various suture material. However, these devices are not always adept at capturing and retaining the suture to be cut, particularly if the suture if the suture is not tensioned or if tensioning on the suture changes after capture. Accordingly, there is a need in the art for a suture cutter that has improved suture loading and capturing.

BRIEF SUMMARY OF THE INVENTION

The present invention is a suture cutter that can easily load and retain a tensioned or un-tensioned suture in place for cutting. The suture cutter has a handle with a body and a lever integrally formed with body so that the lever is biased to return to an initial position if the lever is moved from the initial position to an actuated position by a user. A shaft is coupled to and extending longitudinally from the handle. A tip having a channel extending transversely across the tip that permits access to a cradle and a blade that is moveable within the tip between a retracted position and an extended position wherein the blade traverses the cradle. A piston is positioned within the handle and moveable longitudinally within the handle in response to movement of the lever. A pusher is interconnected to the blade and the piston so that movement of lever from the initial position to the actuated position causes the blade to move from the retracted position to the extended position. The body includes a guide assembly having a pair of opposing members having a pair of corresponding opposing slots that align to form a guide for a head of the piston. The pair of opposing members of the guide assembly are coupled together by a pair of living hinges. The piston includes a post that extends from the head of the piston to engage the lever. A pivot block is positioned in the body in abutment with the piston so that movement of the lever against the post of the piston causes the head of the piston to move longitudinally within the guide of the guide assembly. The pusher is planar and is oriented horizontally within the shaft. The blade is planar and is oriented vertically within the shaft to be at a right angle to the pusher. The blade has a tab that is captured by a notch in the pusher to interlock the blade and the pusher. The shaft includes a plurality of slots that are captured by a corresponding plurality of detents of the guide assembly.

In one embodiment, the channel of the tip tapers inwardly from a first, wider diameter to a second, narrower diameter proximate to the cradle. In another embodiment, the channel of the tip may be contoured to discourage a suture from existing the channel. In a further embodiment, the tip may include a cover that can slide longitudinally between a first position that closes communication with the channel and a second position that opens communication with the channel.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION OF THE INVENTION

Figure 1:
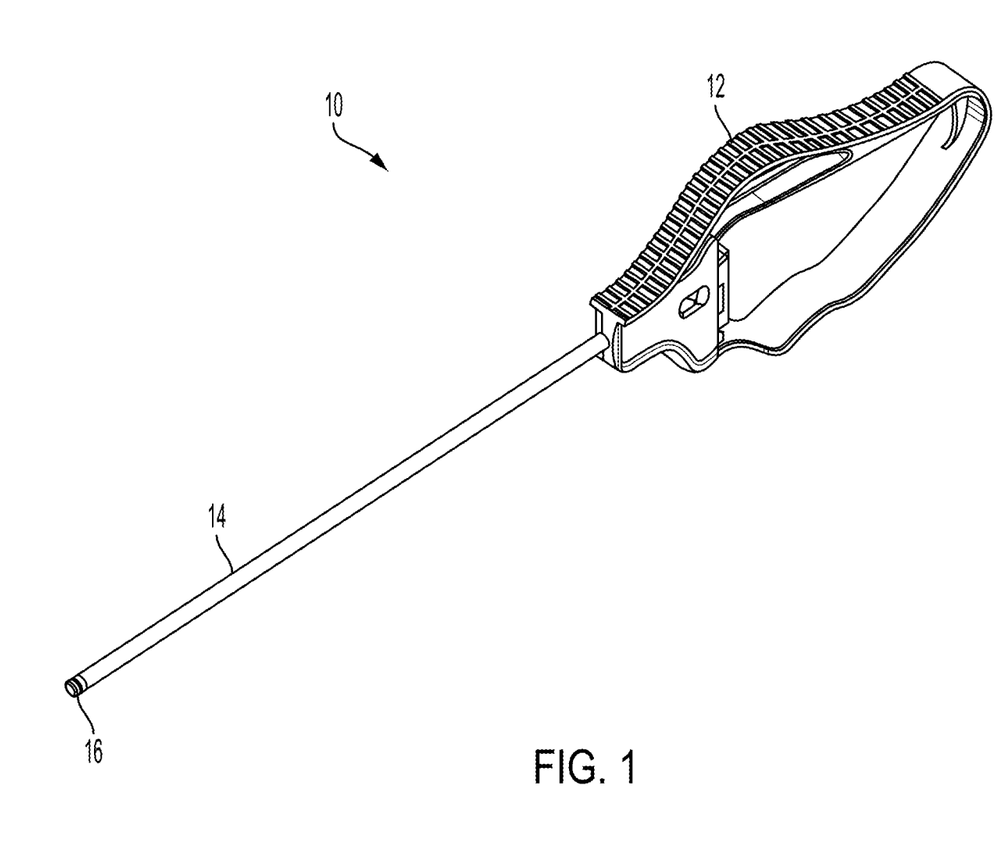
FIG. 1 is a perspective view of a suture cutter according to the present invention in a fully assembled state.
Figure 2:
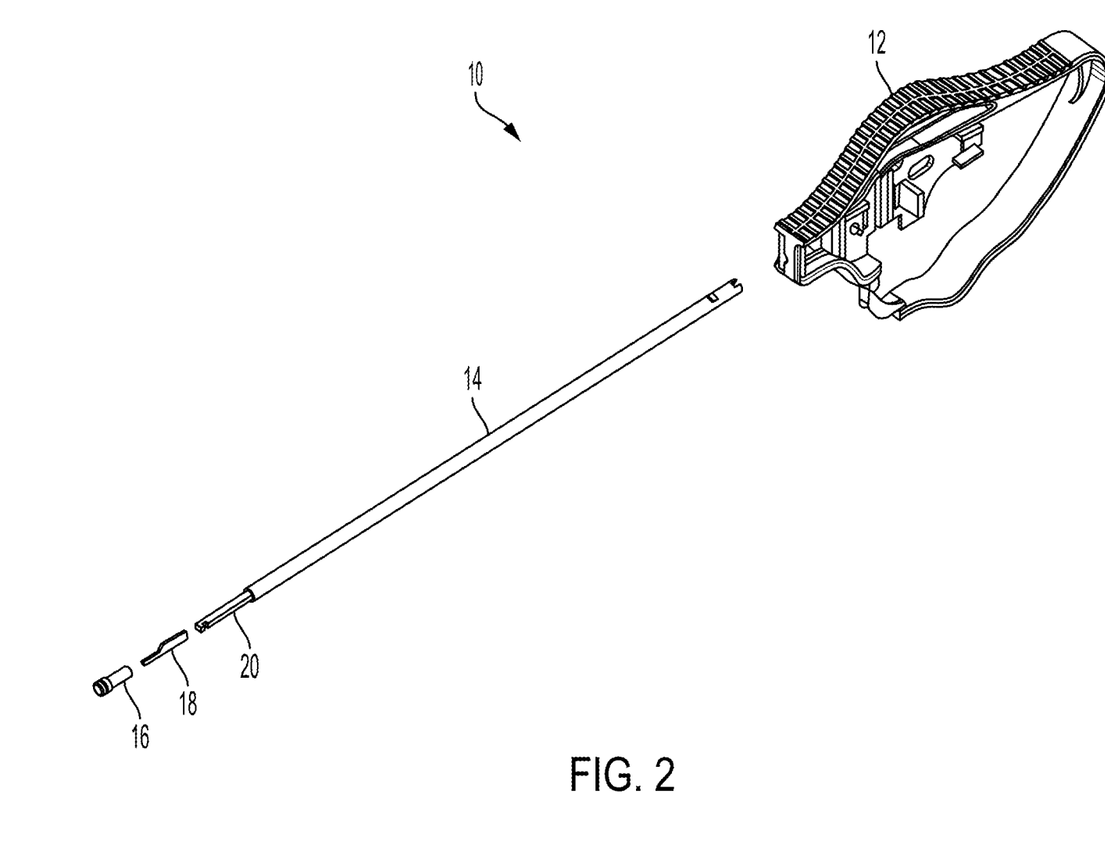
FIG. 2 is a view of a suture cutter according to the present invention in a partially assembled state with a piston guide unfolded.

Referring to the figures, wherein like numerals refer to like parts throughout, there is seen in FIG. 1 a suture cutter 10 having a handle 12, a cannulated shaft 14 extending from handle 12, and a tip 16 is positioned at the end of cannulated shaft 14. Referring to FIG. 2, a blade 18 is disposed in tip 16 and operated by a pusher 20 that extends within canulated shaft 14 between blade 18 and handle 12. Pusher 20 is preferably formed from flat stock and oriented within horizontally within shaft 14.

Figure 3:
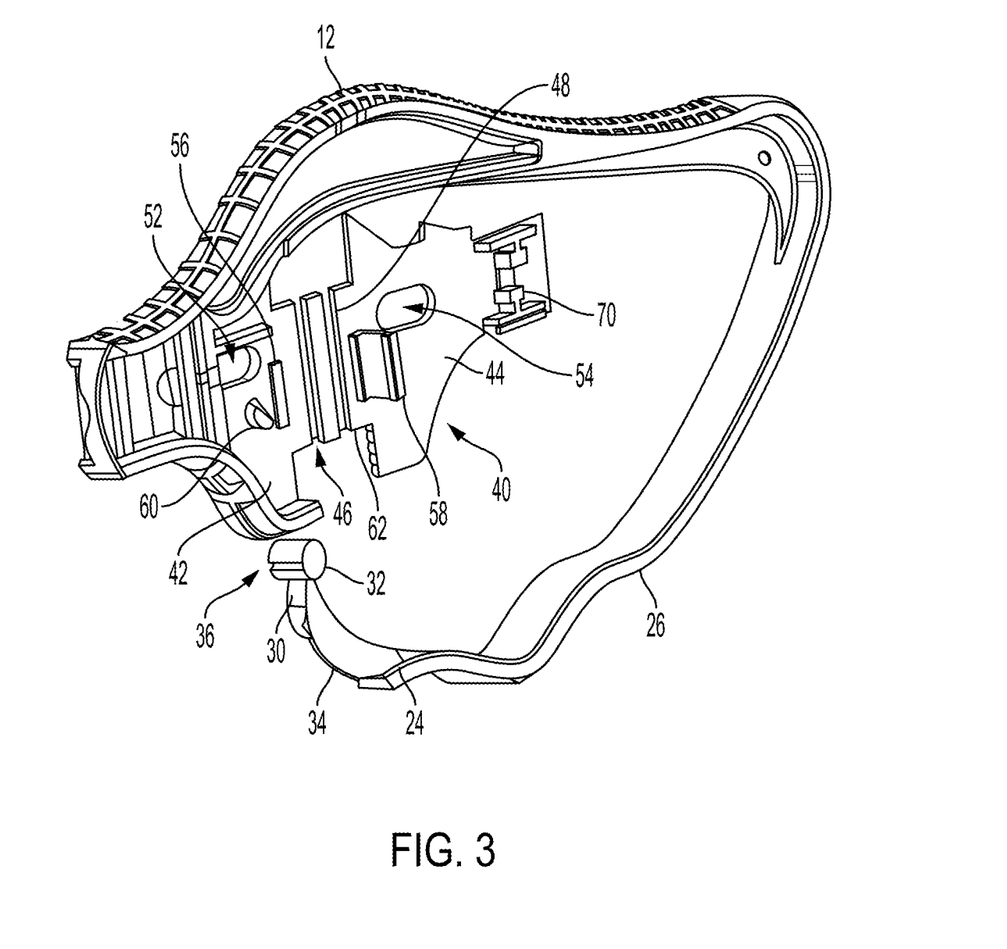
FIG. 3 is view of a suture cutter handle is a partially assembled state with the piston guide unfolded, the piston displaced, and the lever in an unbiased position.
Figure 4:
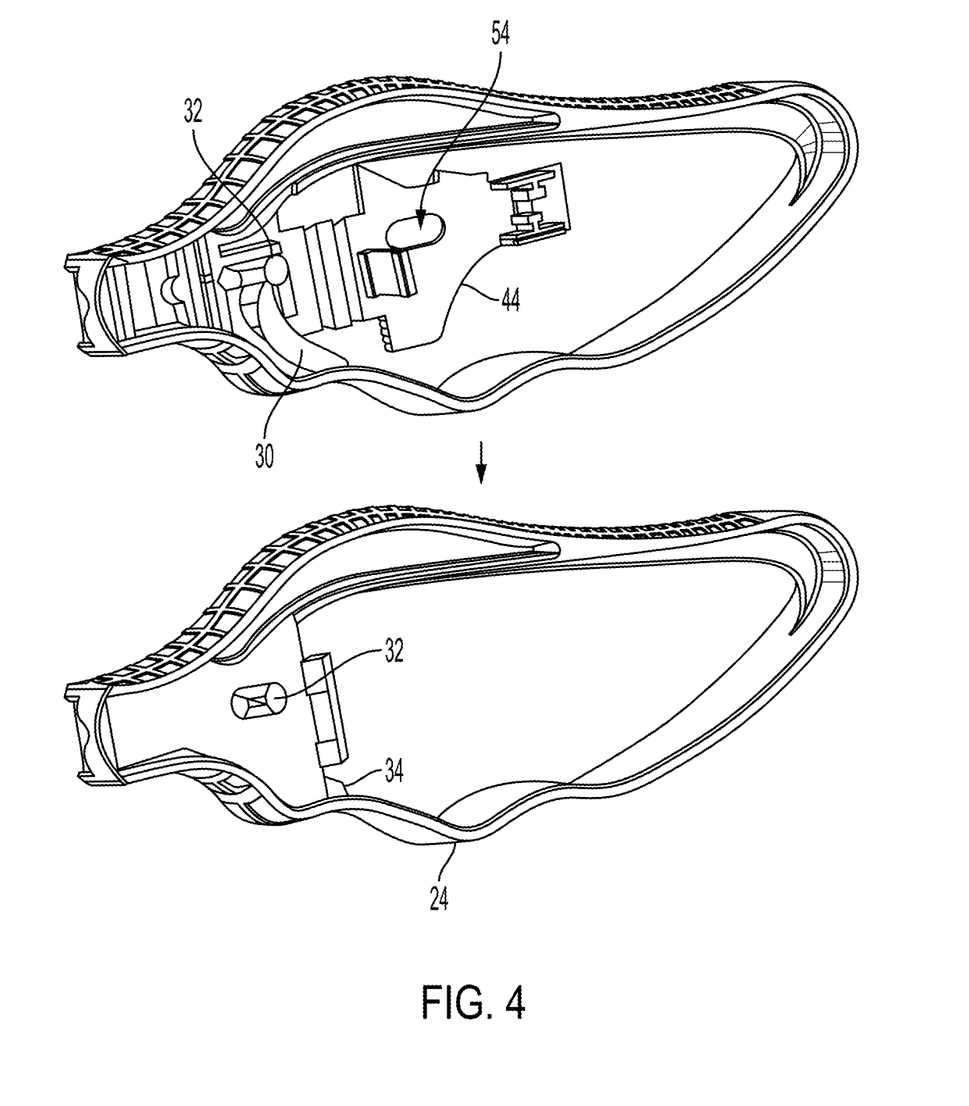
FIG. 4 is a view of a suture in the partially and fully assembled states showing the folding of the piston guide into place to complete assembly of the body, piston, and lever.

Referring to FIG. 3, handle 12 includes a compliant lever 24 formed integrally with body 26 of handle 12 to provide a compliant mechanism that can store energy when squeezed by a user, so that lever 24 will return back to its original position when released by a user. FIG. 3 depicts handle in a pre-assembled configuration. When fully assembled, lever 24 is positioned to engage a piston 30 that can drive flat stock pusher 20 to actuate blade 18 in tip 16 to sever suture that has been captured within tip 16 as described herein. Piston 30 includes a head 32 and a post 34 extending from head 32. Head 32 includes a slot 36 extending horizontally that can engage pusher 20. Piston 30 is coupled within body 26 by a guide assembly 40 comprises a pair of opposing members 42 and 44 that are coupled together via a pair of living hinges 46 and 48 that allow for easy assembly of cutter 10. Opposing members 42 and 44 include a pair of slots 52 and 54 that, when opposing members 42 and 44 are folded about living hinges 46 and 48, as seen in FIG. 4, will capture piston head 32 and constrain movement of piston head 32 along the longitudinal axis of shaft 14 and drive pusher 20 in response to movement of lever 24. Corresponding snap-fit features 56 and 58 allow opposing members 42 and 44 to be secured in place around piston head 32 when folded about living hinges 46 and 48, as seen in FIG. 4, which shows opposing members 42 and 44 in the unfolded then folded position.

Referring to FIG. 4, post 34 of piston 30 extends from guide assembly 40 to engage lever 24 after opposing members 42 and 44 are folded about living hinges 46 and 48. As seen in FIG. 3, pivot block 60 extends across handle 12 so that actuation of post 34 by lever 24 will cause piston head 32 to travel longitudinally along slots 52 and 54. As piston head 32 is coupled to pusher 20 by slot 36, movement of lever 24 will drive pusher 20 longitudinally along shaft 14 to actuate blade 18 within tip 16. Opposing members 42 and 44 also form a stop 62 within handle 12 that limits movement of post 34 of piston 30 and thus lever 24 so that a user cannot over-actuate cutter 10.

Figure 5:
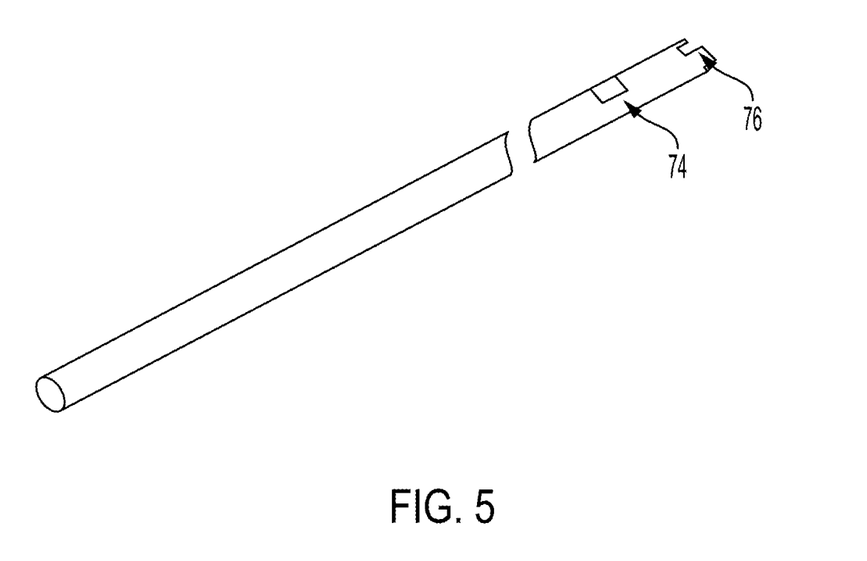
FIG. 5 is a perspective view of shaft for a suture cutter according to the present invention.
Figure 6:
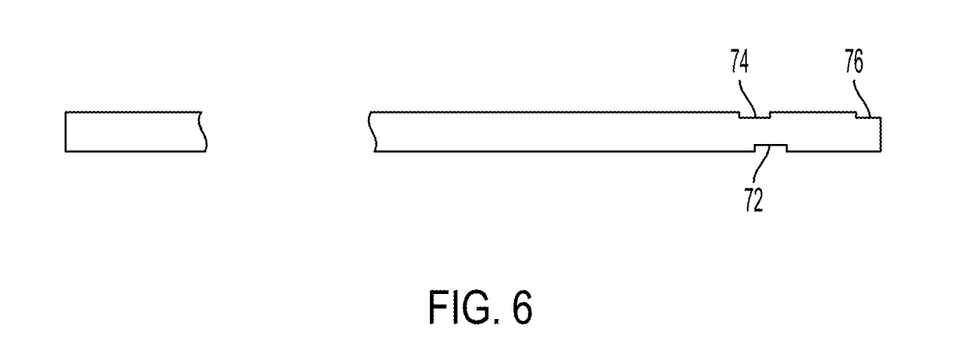
FIG. 6 is a side view of a shaft for a suture cutter according to the present invention.

Referring to FIGS. 5 and 6, shaft 14 is captured within handle 12 and secured against movement by a plurality of detents 70 in guide assembly 40 of handle 12 that interact with a pair of opposing notches 72 and 74 and a third terminal notice 76 in shaft 14 that can couple shaft 14 to handle 12 and prevent rotation of shaft 14 relative to handle 12.

Figure 7:
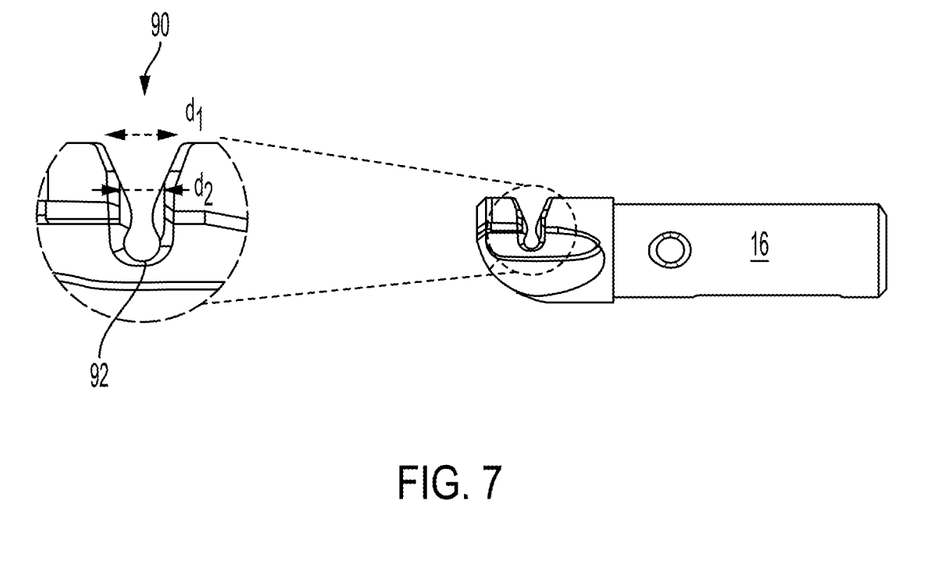
FIG. 7 is a side view and close-up view of a cutting tip for a suture cutter according to the present invention.
Figure 8:
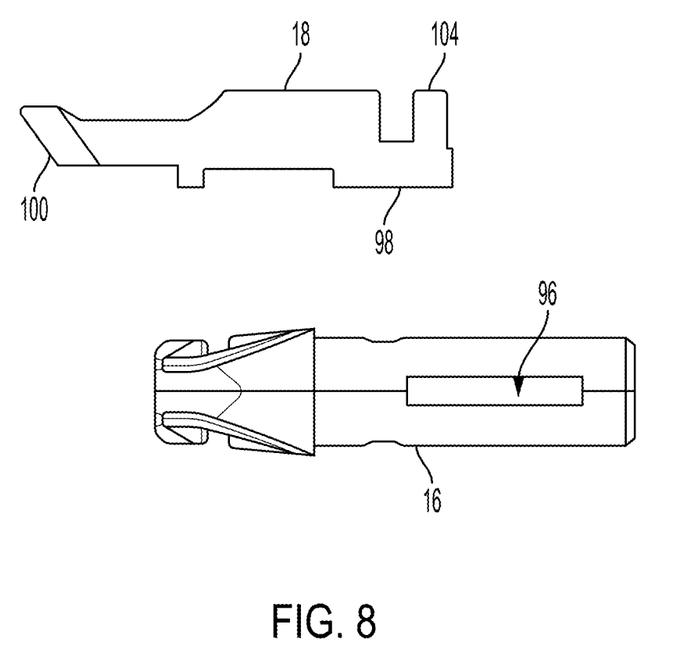
FIG. 8 is side view of a blade for suture cutter alongside a bottom view of a tip showing the interlocking structure of the blade and tip.

Referring to FIG. 7, shaft 14 supports tip 16 that is contoured to define a tapered channel 90 that extends transversely across shaft 14 and narrows to a cradle 92. Channel 90 tapers from a first, wider diameter $(d_1)$ that can allow a portion of taut suture to be captured to a second, narrower diameter $(d_2)$ at cradle 92. Second, narrow diameter $(d_2)$ of slot 303 is dimensioned to be less than the diameter of non-tensioned suture. Channel 90 of tip 16 is oriented so that tip 16 can be navigated below a suture by a user and then lifted to funnel the suture through tapered channel 90 and into cradle 92. Referring to FIG. 8, the underside of tip 16 includes a slot 96 that extends longitudinally and captures a tab 98 of blade 18 to control the longitudinal movement of blade 18. A sharp edge 100 of blade 18 is positioned to move across cradle 92 when driven by pusher 20 and thus sever any suture captured therein.

Figure 9:
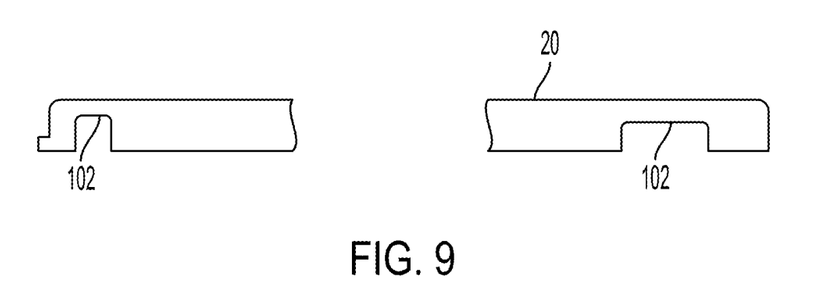
FIG. 9 is a side view of a blade pusher for a suture cutter according to the present invention.
Figure 10:
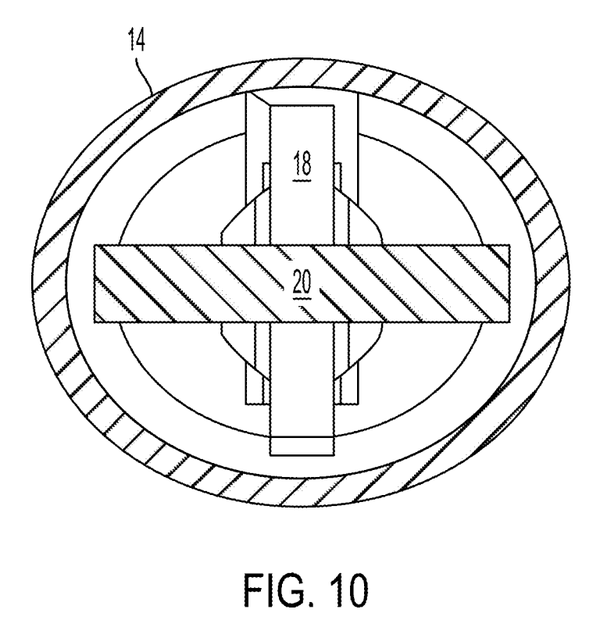
FIG. 10 is a transverse cross-section showing the orientation of the pusher and blade in a suture cutter according to the present invention.

Referring to FIG. 9, pusher 20 includes a notch 102 that engages a tab 104 on blade 18. As seen in FIG. 10, pusher 20 is oriented horizontally within shaft 14 to engage piston 30, with blade 18 oriented vertically in tip 16. This perpendicular relationship of pusher 20 to blade 18 allows engagement of pusher 20 and blade 18 within shaft 14 using just the mechanical constraints of shaft 14 and no additional fasteners or adhesives.

Figure 11:
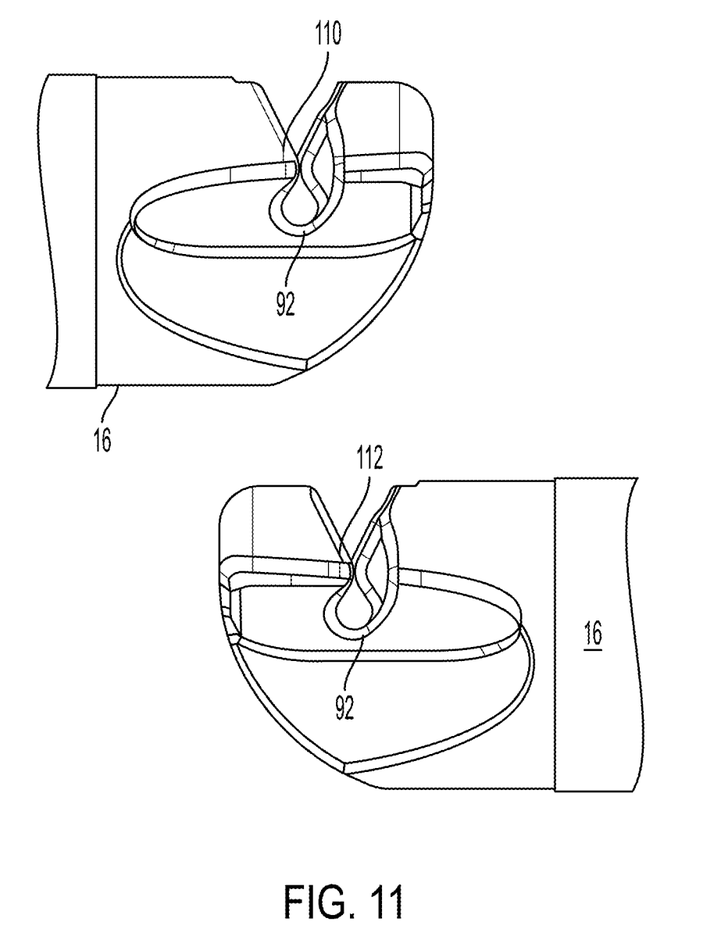
FIG. 11 is a pair of opposing side views of a tip having suture capturing channel surfaces according to the present invention.

Referring to FIG. 11, tip 16 may include opposing blocking surfaces 110 and 112 that extend into channel 90 on opposing sides of channel 90 and have upper portions that impart a slight twist to a suture while allowing suture to slide into channel, where it is released from blocking surfaces 110 and 112. Once the suture has moved fully into channel 90, the lower portions blocking surface 110 and 112 prevent the tensioned suture from inadvertently moving out of channel 90.

Figure 12:
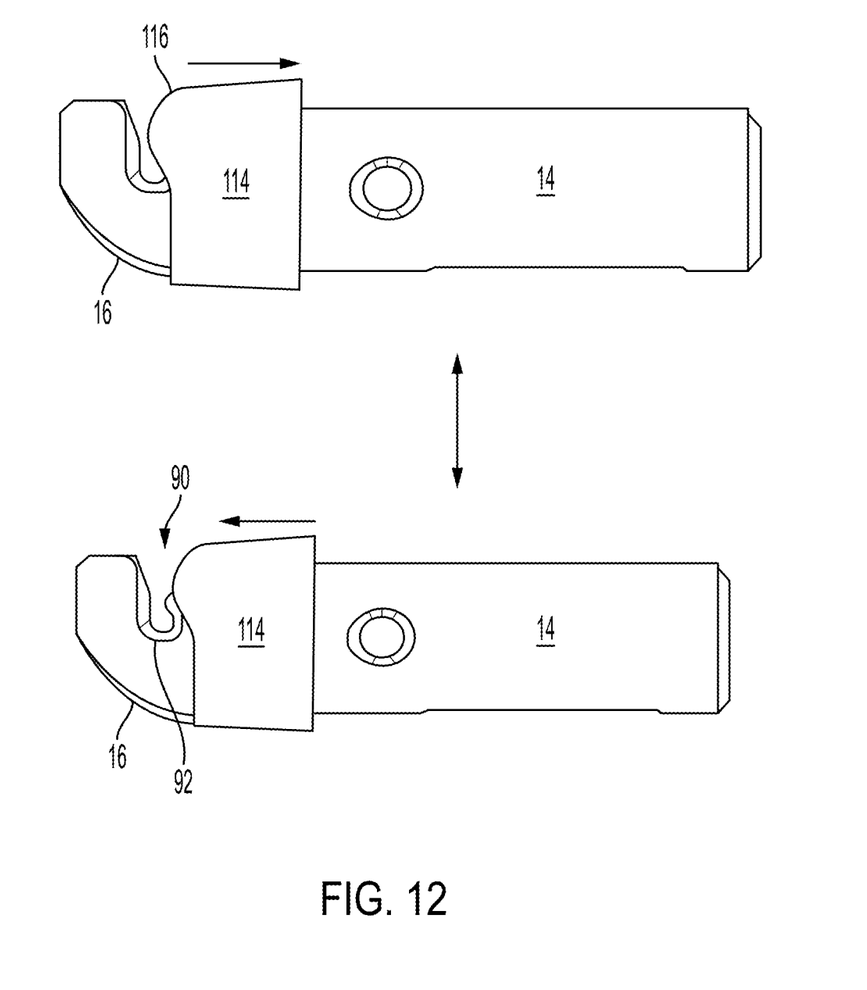
FIG. 12 is a side view of another embodiment of a cutting tip for a suture cutter according to the present invention.

Referring to FIG. 12, in yet another embodiment, tip 16 may include a channel cover 114 that is biased to cover channel 90 but can slide longitudinally to permit and then prohibit communication into and out of channel 90 in response to contact with a suture. For example, when a suture is brought into engagement with cover 114, a bearing surface 116 may provide a force that can cause cover 114 to slide longitudinally toward handle 12 to allow suture to enter channel 90. Once suture has dropped into channel 90 and then cradle 92, cover 114 can return to the original position to entrap suture in channel 90 until it is cut by blade 18. This embodiment eliminates the requirement to have tension on the suture in order to retain suture capture in cradle 92 of tip 16, and prevents an un-tensioned suture from unintentionally exiting cradle 92 as tension is not required on the suture to keep the suture trapped within cradle 92.

What is claimed is:

1. A suture cutter, comprising:
   a handle having a body and a lever integrally formed with the body so that the lever is biased to return to an initial position if the lever is moved from the initial position to an actuated position by a user,
   a shaft coupled to and extending longitudinally from the handle;
   a tip having a channel extending transversely across the tip that permits access to a cradle and a blade that is moveable within the tip between a retracted position and an extended position wherein the blade traverses the cradle;
   a piston positioned within the handle and moveable longitudinally within the handle in response to movement of the lever;
   a pusher interconnected to the blade and the piston so that movement of the lever from the initial position to the actuated position causes the blade to move from the retracted position to the extended position;
   wherein the body includes a guide assembly having a pair of opposing members with a pair of corresponding opposing slots that align to form a guide for a head of the piston; and
   wherein the pair of opposing members of the guide assembly are coupled together by a pair of living hinges.

2. The suture cutter of claim 1, wherein the piston includes a post that extends from the head of the piston to engage the lever.

3. The suture cutter of claim 2, further comprising a pivot block positioned in the body in abutment with the piston so that movement of the lever against the post of the piston causes the head of the piston to move longitudinally within the guide assembly.

4. The suture cutter of claim 3, wherein the pusher is planar and is oriented horizontally within the shaft.

5. The suture cutter of claim 4, wherein the blade is planar and is oriented vertically within the shaft to be at a right angle to the pusher.

6. The suture cutter of claim 5, wherein the blade has a tab that is captured by a notch in the pusher to interlock the blade and the pusher.

7. The suture cutter of claim 6, wherein the shaft includes a plurality of slots that are captured by a corresponding plurality of detents of the guide assembly.

8. The suture cutter of claim 7, wherein the channel of the tip tapers inwardly from a first, wider diameter to a second, narrower diameter proximate to the cradle.

9. The suture cutter of claim 7, wherein the channel of the tip is contoured to discourage a suture from exiting the channel.

* * * * *